United States Patent [19]
Howard

[11] 4,066,377
[45] Jan. 3, 1978

[54] TOOL ELEMENT PLACEMENT MEANS

[75] Inventor: Curtiss Gilmore Howard, Manchester, Conn.

[73] Assignee: United Technologies Corporation, Hartford, Conn.

[21] Appl. No.: 666,110

[22] Filed: Mar. 11, 1976

[51] Int. Cl.² .................. B23B 35/00; B23B 39/16; C25D 17/00; B23K 9/16
[52] U.S. Cl. ........................... 408/1 R; 408/238; 204/224 M; 219/69 E; 269/294; 408/42
[58] Field of Search .............. 408/1 R, 42, 238, 241; 219/69 E, 69 M; 204/284, 285, 297 R, 224 M; 269/1

[56] References Cited
U.S. PATENT DOCUMENTS

| 353,124 | 11/1886 | Dickson | 408/1 |
|---|---|---|---|
| 2,807,875 | 10/1957 | Snyder | 408/1 X |
| 3,536,603 | 10/1970 | Bonga | 219/69 E |
| 3,604,883 | 9/1971 | Dietz | 219/69 E |
| 3,886,059 | 5/1975 | Mikulski | 204/224 M |
| 3,981,786 | 9/1976 | Andrews | 219/69 M |

FOREIGN PATENT DOCUMENTS 703,305   2/1954   United Kingdom ............ 269/1

*Primary Examiner*—Harrison L. Hinson
*Attorney, Agent, or Firm*—Edward J. Timmer

[57] ABSTRACT

The present invention is useful in establishing a plurality of tool elements in a desired configuration in relation to a workpiece surface. A typical device of the invention has a guide member having a flexible section containing tool element guide means, means for deflecting the flexible section to position the guide means in the desired configuration and means for establishing a cooperative relationship between the desired configuration of guide means and the workpiece surface. The invention is particularly applicable to positioning a plurality of drilling elements in a configuration corresponding and in precise relationship to the curvature of the edge of a gas turbine engine blade or vane.

24 Claims, 6 Drawing Figures

U.S. Patent   Jan. 3, 1978   Sheet 1 of 4   4,066,377
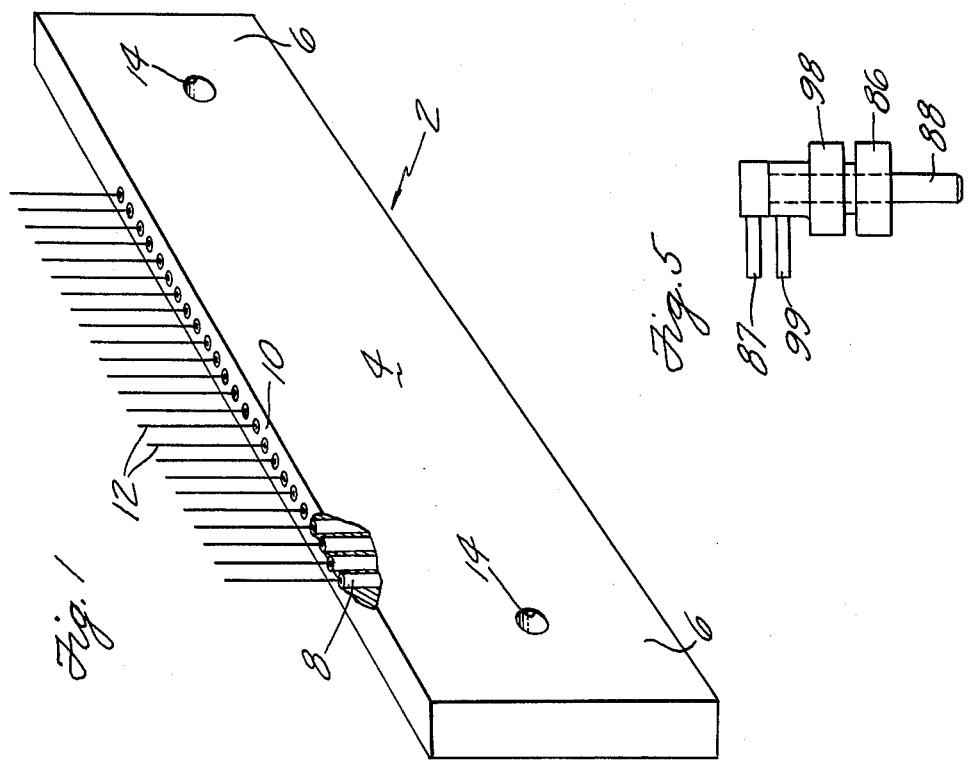
Fig. 1
Fig. 5
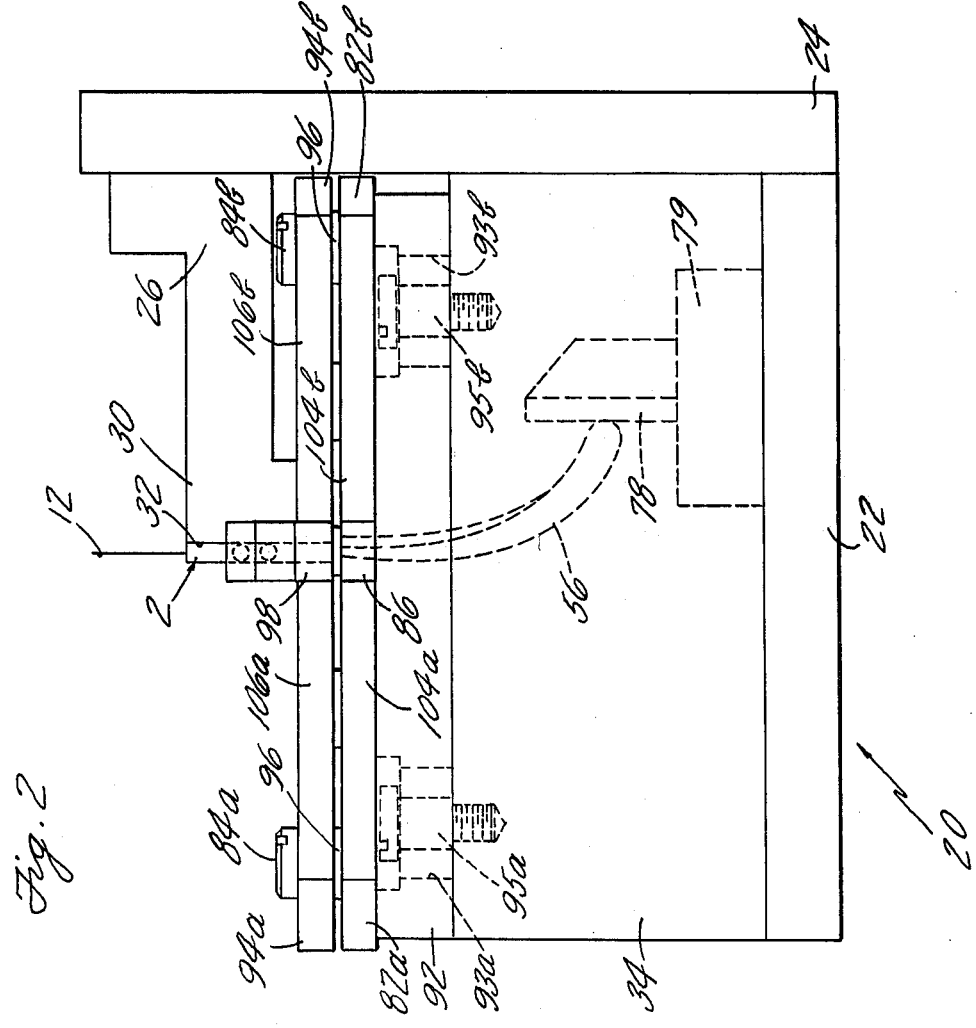
Fig. 2

TOOL ELEMENT PLACEMENT MEANS

BACKGROUND OF THE INVENTION

1. Field of the Invention

An apparatus and method for establishing a plurality of tool elements in a desired configuration in relation to a workpiece surface are disclosed.

2. Description of the Prior Art

In the production of modern gas turbine engines, critical components subjected to high stress and temperature are oftentimes provided with internal cooling. For example, certain parts such as turbine blades or vanes are produced by sophisticated casting techniques to have an internal cooling cavity. After casting, holes are drilled by electrical discharge or electrochemical techniques in the leading or trailing edges of the airfoil section of the blade or vane to communicate with the cavity and provide a path for the circulation of cooling air therethrough. However, the drilling of such cooling holes has been fraught with difficulty because these edges bow or curve along the airfoil section of the part to achieve the desired aerodynamic effect. The problem has been one of proper placement and support of the drilling elements, such as electrodes, in a configuration corresponding and in precise relation to the curvature of the edge. As evidenced by U.S. Pat. Nos. 3,767,555; 3,803,015; 3,827,965; and 3,842,840, prior art workers have relied primarily on drilling element guides of a rigid, solid nature having prealigned guide holes therein for proper placement and support of the drilling elements.

If holes are to be drilled on the centerline of the curved edge of the blade or vane; for example, where it is necessary to maintain a minimum edge wall thickness, further difficulty is encountered as a result of casting or other part tolerances. These tolerances result in substantial variations from part to part in the thickness and amount of bow or curvature of the edge to be drilled and, thus, make positioning of the drilling elements in a configuration corresponding and in precise relation to the centerline of the curved edge of each part extremely difficult.

SUMMARY OF THE INVENTION

The present invention provides means for establishing a plurality of tool elements in a desired configuration in relation to a workpiece surface. The invention is particularly applicable to simultaneously positioning a plurality of drilling elements in a configuration corresponding and in precise relation to the curvature of a workpiece surface.

A typical device of the invention has a guide member having a flexible section containing a plurality of tool element guide means, means for deflecting the flexible section to position the guide means in the desired configuration and means for establishing a cooperative relationship between the desired configuration of guide means and the workpiece surface. In a preferred embodiment, the device further includes mechanisms to locate the centerline of a curved workpiece surface and to deflect the flexible section to position the tool elements in a configuration corresponding to such centerline.

Other objects and advantages of the present invention will appear more fully from the following detailed description of the preferred embodiment.

BRIEF DESCRIPTION OF THE DRAWING

FIG. 1 is a perspective view of the guide member used in the device;

FIG. 2 is a side elevation of the preferred device before deflection of the guide member;

FIG. 5 is a front elevation of a cam arrangement utilized in the preferred device.

DESCRIPTION OF THE PREFERRED EMBODIMENT

Figure 3:
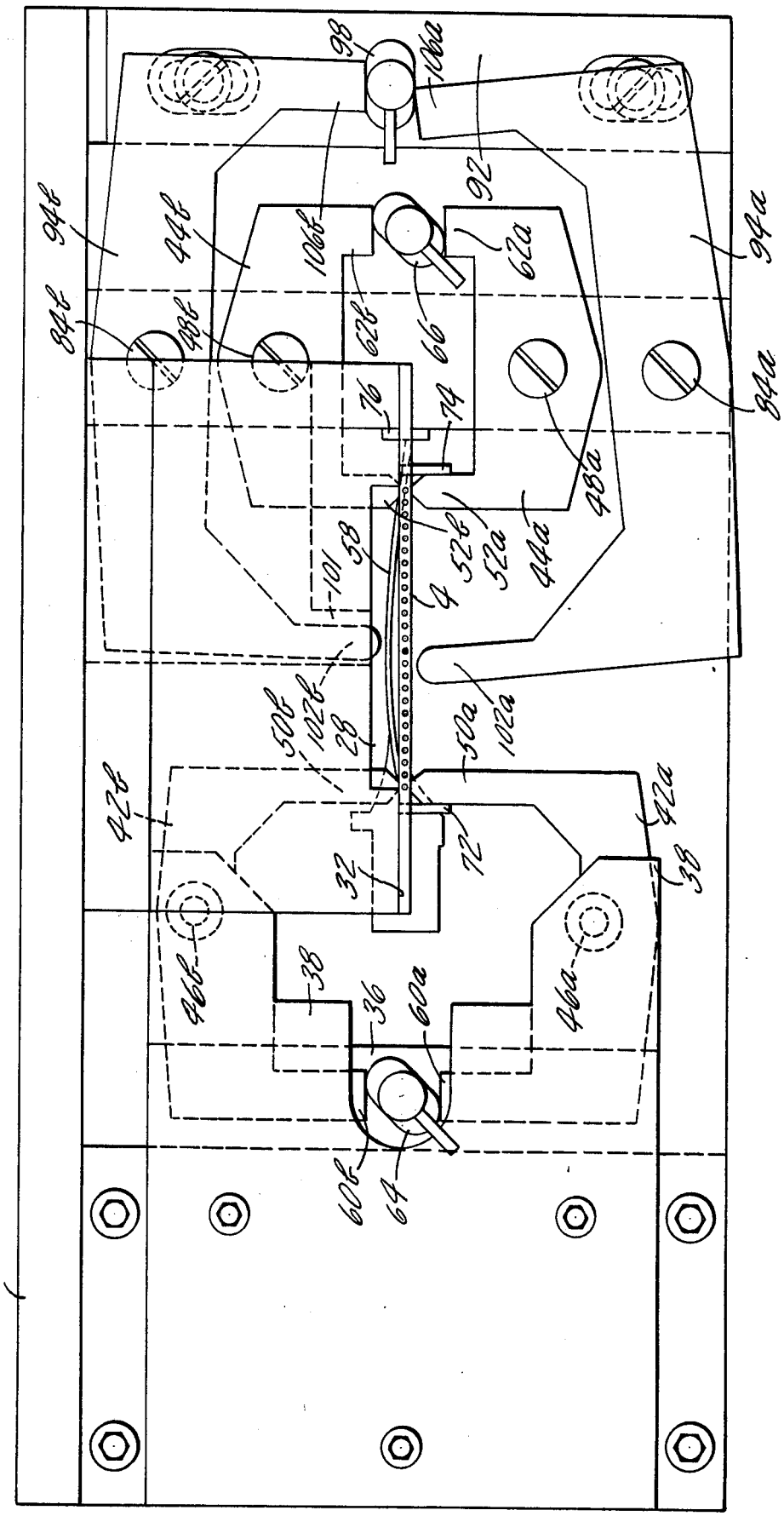
FIG. 3 is a plan view of the preferred device before deflection of the guide member.

Although the device of the invention is hereafter described in connection with the simultaneous positioning of a plurality of drilling elements in a configuration corresponding and in precise relation to the curvature of the trailing edge of a gas turbine engine blade, it is to be understood that the device is not so limited. The inventive device has wide applicability in processes wherein a plurality of tool elements are established in a desired configuration in relation to a workpiece surface. Tool elements, as used herein, is intended to include machining elements such as drilling electrodes, bits and the like; joining elements such as welding electrodes, wires or the like; coating elements such as paint or plasma spray nozzles or the like and other means for performing operations on a workpiece surface.

Referring first to FIG. 1, the guide member 2 is shown as comprising a flexible section 4 and end sections 6. Flexible section 4 has a plurality of tool element guide means, such as guide tubes 8, embedded in substantially parallel alignment in flexible matrix 10. Tool elements, such as drilling elements 12, can be slidably positioned within guide tubes 8 either before or after flexible section 4 is deflected. Of course, the size and number of guide tubes 8 and drilling elements 12 inserted therein will depend on the size and number of holes to be drilled in the workpiece surface. The primary characteristic required of flexible section 4 is that it be capable of sustaining sufficient deflection to position the guide tubes 8 in the desired configuration. It has been found that copper guide tubes embedded in a fiber glass matrix provide the required flexibility. Those skilled in the art will recognize, however, that flexible section 4 may be made of other materials and that the flexural characteristics thereof may thus be varied as desired.

As shown best in FIGS. 2 and 3, device 20 has a base 22 and a support member 24 connected perpendicularly thereto. Attached to and projecting from support member 24 over base 22 is guide member support 26. Guide member support 26 has a notch 28 therein on the side opposite support member 24 which notch 28 defines spaced support flanges 30. Spaced flanges 30 have engagement surfaces 32 to which the end sections 6 of guide member 2 are attached by inserting suitable fastening means, such as screws or the like, through holes 14 of end sections 6. Guide member support 26 may have other notches or passages therein to accommodate sections of the workpiece and the like. If desired, support member 24 and guide member support 26, hereafter called support structure, may be attached to a body or member independent of base 22 so long as the guide member is supported in proper relation to said base.

Mounted on base 22 below and on either side of guide member support 26 are fixturing blocks 32 and 34. Blocks 32 and 34 have fixturing flanges 36 and 38 and 40, respectively, projecting therefrom toward guide member support 26. As seen best in FIGS. 3 and 4, two pairs of coplanar fixturing levers 42a & b and 44a & b are centrally and pivotally mounted in an opposed relationship on flanges 38 and 40 by pivot screws 46 a & b and 48a & b, respectively, in a plane just below flexible section 4. Fixturing levers 42a & b and 44a & b are provided with fixturing fingers 50a & b and 52a & b, respectively, at one end to engage the workpiece, here shown as a turbine blade 54 having a root section 55, an airfoil section 56 and curved trailing edge 58, and fixturing shoulders 60a & b and 62a & b, respectively, at the other end to engage cams 64 and 66, respectively. The pair of fixturing levers 42a & b is actuated by cam 64 which is shown rotatably mounted on flange 36 in alignment with the longitudinal axis of flexible section 4. Similarly, the pair of fixturing levers 44a & b is actuated by cam 66 which is shown rotatably mounted on flange 40 in alignment with the longitudinal axis of flexible section 4. Cams 64 and 66 are rotated by turning handles 65 and 67, respectively. The dimensions and configuration of fixturing levers 42a & b and 44a & b are selected such that fingers 50a & b and 52a & b close at the ends of the airfoil section 56 when cams 64 and 66 are rotated against shoulders 60a & b and 62a & b, respectively. Suitably positioned on fingers 50a and 52 a are vertical locating stops 72 and 74, which are received in notches (not shown) in flexible section 4 and flanges 30 when the fingers are closed. Horizontal locating stop 76 is suitably disposed on flange 40 of block 34. When blade 54 is placed in the device 20, fingers 50a & b and 52a & b, when closed, and locating stops 72, 74 and 76 cooperate to align trailing edge 58 such that the two points on said edge between which a plurality of holes are to be drilled are positioned precisely below the guide tubes at each end of flexible section 4, as shown in FIG. 3. If holes are to be drilled on the centerline of edge 58, the two points will lie on such centerline. If desired, locating post 78 may be suitably supported and positioned by platform 79 on base 22 to engage the leading edge of blade 54. Although the fixturing structure has been described in great detail above, it should be understood by those skilled in the art that other fixturing structures may be utilized in the present invention.

As is evident from FIG. 3, flexible section 4 must then be deflected during the drilling operation to position the remaining guide tubes 8 in a configuration corresponding to the curvature of edge 58 between the two points previously aligned. A preferred means for deflecting flexible section 4 is comprised of a pair of opposed deflection levers pivotally mounted from the base in a plane which intersects the flexible section and is described in more detail below in connection with the mechanisms used to locate the centerline of the trailing edge 58 and deflect the flexible section 4 to position the guide tubes in a pattern corresponding to such centerline. Those skilled in the art will recognize that other deflection means may be employed to achieve positioning of the guide tubes in the desired configuration. Multiple deflection means may be utilized where necessary to achieve a complex deflection pattern, such as an S-shaped deflection.

Figure 4:
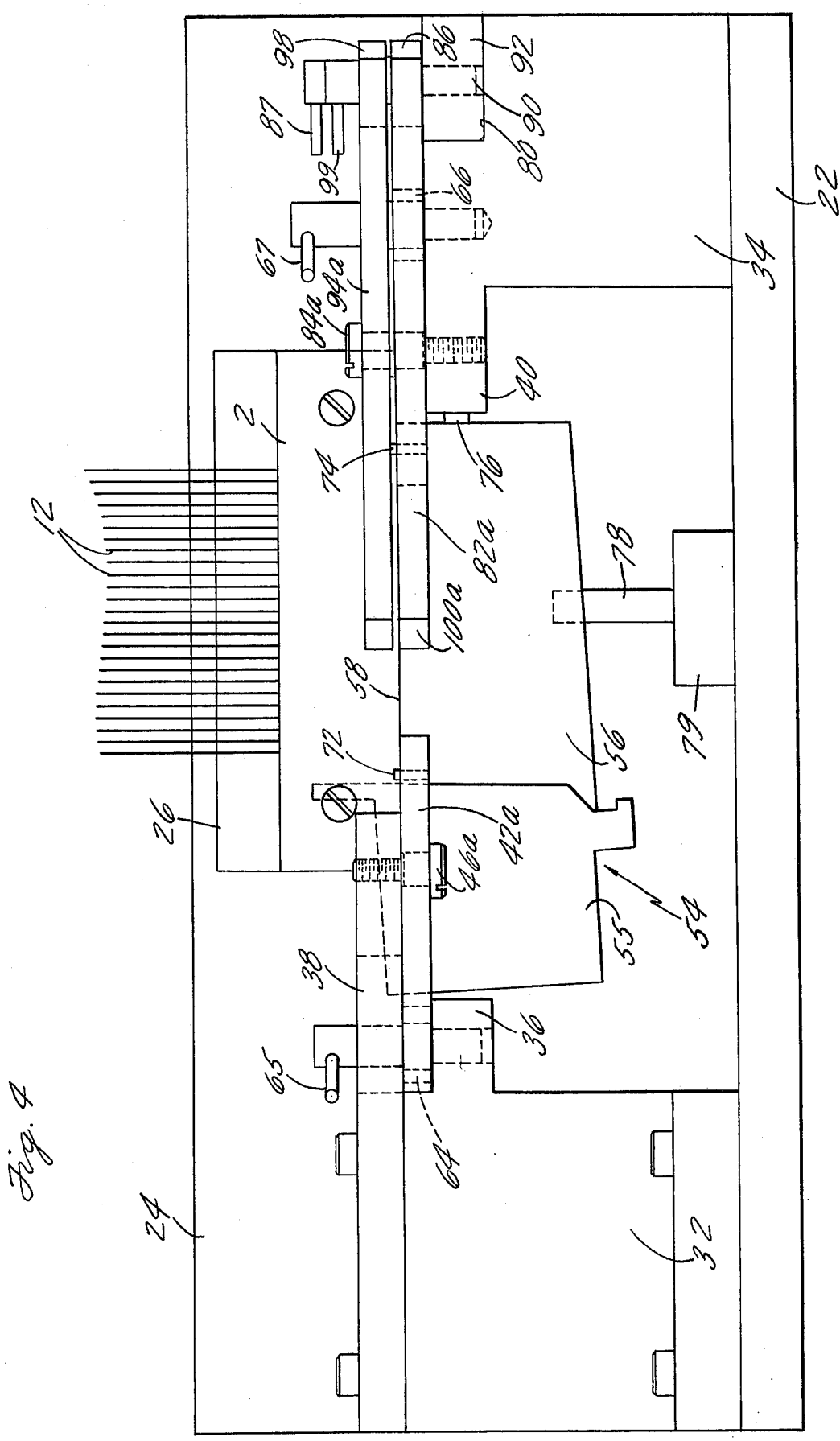
FIG. 4 is a front elevation of the preferred device before deflection of the guide member.

As shown most clearly in FIG. 4, fixturing block 34 has a flange 40 extending in the direction of guide member support 26 and, on the side opposite flange 40, a notch 80 perpendicular to the longitudinal axis of flexible section 4. Mounted on flange 40 around fixturing levers 44a & b and coplanar therewith is a pair of opposed gauging levers 82a & b centrally pivoted on pivot screws 84a & b. Levers 82a & b are actuated by cam 86 and handle 87 which are mounted on shaft 88 as shown in FIG. 5. Shaft 88 is received in hole 90 partially through sliding member 92, the hole 90 having a slightly greater diameter than that of shaft 88 so that the latter may freely rotate therein. Sliding member 92 is supported in notch 80 perpendicular to the longitudinal axis of flexible section 4 and is guided thereon by cooperation between slots 93a & b and screws 95a & b. Mounted atop gauging levers 82a & b on common pivot screws 84a & b is a pair of opposed deflection levers 94a & b. Deflection levers 94a & b are spaced by washers 96 upwardly from gauging levers 82a & b in a plane which intersects flexible section 4. Deflection levers 94a & b are actuated by cam 98 and handle 99 which are slip-mounted on shaft 88 as shown in FIG. 5. To permit deflection lever 94b to engage flexible section 4 when it is actuated, guide member support 26 is provided with suitable passage 101 therein to accommodate said lever. Gauging levers 82a & b and deflection levers 94a & b are provided with gauging and deflection fingers 100a & b and 102a & b, respectively, and gauging and deflection shoulders 104a & b and 106a & b, respectively, which fingers and shoulders are of suitable size and configuration to function in the manner described below.

Figure 6:
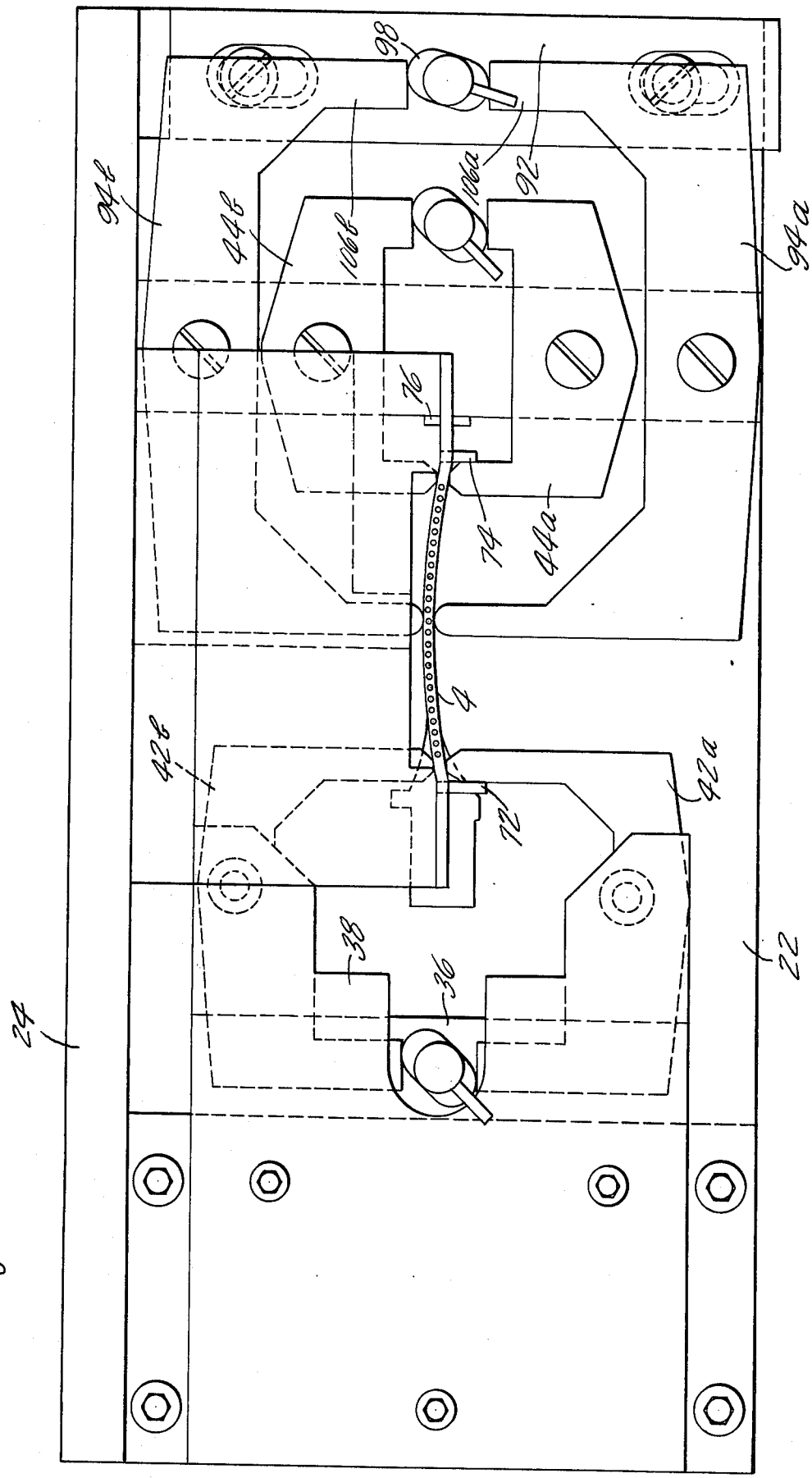
FIG. 6 is a plan view of the preferred device after deflection of the guide member.

After trailing edge 58 of blade 54 has been precisely aligned beneath flexible section 4, as described hereinabove and as shown in FIG. 3, gauging levers 82a & b are actuated by rotating cam 86 against shoulders 104a & b. Gauging fingers 100a & b are thereby engaged with the airfoil section 56 in an opposed relationship just below and on each side of trailing edge 58 and locate the centerline thereof at the point of contact, shown in FIG. 6 at the midlength of airfoil section 56. Engagement of fingers 100a & b causes sliding member 92 to slide in notch 80 in a direction opposite to that of the edge curvature by an amount related to the distance by which the edge curvature deviates from the longitudinal axis of flexible section 4 at the point of contact. When cam 98 is then rotated, deflection fingers 102a & b of deflection levers 94a & b will be caused to engage flexible section 4 and deflect it to position the guide tubes 8 in a pattern corresponding to the centerline previously located by gauging fingers 100a & b of gauging levers 82a & b. The guide tubes 8 and the drilling elements 12 inserted therein are thereby positioned in a pattern corresponding and in a cooperative relationship to the centerline of edge 58 along the entire distance to be drilled as shown in FIG. 6. Additional gauging levers, deflection levers and sliding members and cooperating components may be employed to locate the centerline of the trailing edge and deflect the flexible section at additional points. These may be desirable if complex deflections, such as S-shaped deflections, are required or if the length of the edge to be drilled is so long that deflection at multiple points is required to obtain conformance of the flexible section therewith.

The device as described in detail above may be employed in connection with a wide variety of conventional electrical discharge, electrochemical or other drilling machines. Base plate 22 may be readily adapted to be received and positioned in such machines or may be an integral part thereof.

Of course, those skilled in the art will recognize that other embodiments of the invention are possible. For example, a device wherein the flexible section is first deflected to establish the guide means in the desired configuration and the workpiece surface then positioned in cooperative relationship thereto is within the scope of the invention. In achieving such cooperative relationship either the support structure or the fixturing structure or both may be movable in relation to one another.

Although the invention has been shown and described with respect to illustrative embodiments thereof, it should be understood by those skilled in the art that other changes, omissions and additions in the form and detail thereof may be made therein without departing from the spirit and scope of the invention.

Having thus described typical embodiments of my invention, that which I claim as new and desire to secure by Letters Patent of the U.S. is:

1. A device useful in establishing a plurality of tool elements in a desired configuration in relation to a workpiece surface comprising:
   a. a base;
   b. a support structure;
   c. a guide member having a flexible section containing guide means adapted to receive the tool elements, said member being supported in relation to the base by the support structure;
   d. means for deflecting the flexible section to position the guide means in the desired configuration; and
   e. a fixturing structure to hold the workpiece, said fixturing structure and support structure establishing a cooperative relationship between the flexible section and workpiece surface.

2. The device of claim 1 wherein the support structure comprises:
   a. a support member attached to the base; and
   b. a guide member support attached to and projecting from said support member over said base, said guide member support having spaced flanges on the side opposite said support member, to which flanges said guide member is attached.

3. The device of claim 1 wherein the flexible section of said guide member includes guide tubes embedded in a flexible matrix.

4. The device of claim 3 wherein copper guide tubes are embedded in a fiber glass matrix.

5. The device of claim 1 wherein the fixturing structure comprises:
   a. two pairs of coplanar fixturing levers pivotally mounted in an opposed relationship from the base in a plane just below the flexible section, each pair of levers having opposed fingers at one end to engage the workpiece and opposed shoulders at the other end;
   b. two cams rotatably mounted from the base in said plane, each cam being positioned between the opposed shoulders of one pair of levers, said levers being actuated by rotating the cams against the shoulders; and
   c. locating stop means in predetermined relation to said levers, said stop means and fixturing levers cooperating to hold the workpiece surface in the desired position.

6. The device of claim 1 wherein the deflection means comprises:
   a. a pair of opposed deflection levers pivotally mounted from the base in a plane which intersects said flexible section, said pair of levers having opposed fingers at one end to engage and deflect said flexible section and opposed shoulders at the other;
   b. a sliding member slidably mounted from the base beneath said shoulders; and
   c. a cam rotatably mounted on the sliding member in said plane, said cam being positioned between the opposed shoulders of said levers, said levers being actuated by rotating the cam against the shoulders.

7. In a device wherein a plurality of tool elements are established in a desired configuration in relation to a workpiece surface, the combination of:
   a. a guide member having a flexible section containing guide means adapted to receive the tool elements;
   b. means for deflecting the flexible section to position the guide means in the desired configuration; and
   c. means for establishing a cooperative relationship between the desired configuration of guide means and the workpiece surface.

8. A device useful in simultaneously positioning a plurality of drilling elements in a configuration corresponding and in precise relation to the curved edge of a gas turbine engine part comprising:
   a. a base;
   b. a support structure;
   c. a guide member having a flexible section containing guide means adapted to receive the drilling elements, said member being supported from the base by the support structure;
   d. a fixturing structure attached to the base to hold the part, said fixturing structure and support structure establishing a positional relationship between the edge and flexible section such that the two points of the edge between which a plurality of holes are to be drilled are positioned precisely below the guide means at each end of the flexible section; and
   e. means for deflecting the flexible section between said ends to position the remaining guide means in a configuration corresponding to the curvature of the edge.

9. The device of claim 8 wherein the support structure comprises:
   a. a support member attached to the base; and
   b. a guide member support attached to and projecting from said support member over said base plate, said guide member support having spaced flanges on the side opposite said support member, to which flanges said guide member is attached.

10. The device of claim 8 wherein the flexible section of said guide member includes guide tubes embedded in a flexible matrix.

11. The device of claim 10 wherein copper guide tubes are embedded in a fiber glass matrix.

12. The device of claim 8 wherein the fixturing structure comprises:
    a. two pairs of coplanar fixturing levers pivotally mounted in an opposed relationship from the base in a plane just below the flexible section, each pair of levers having opposed fingers at one end to engage the workpiece and opposed shoulders at the other end;

b. two cams rotatably mounted from the base in said plane, each cam positioned between the opposed shoulders of one pair of levers, said levers being actuated by rotating the cams against the shoulders; and c. locating stop means in predetermined relation to said levers, said stop means and fixturing levers cooperating to hold the workpiece surface in the desired position.

13. The device of claim 8 wherein the deflection means comprises:

a. a pair of opposed deflection levers pivotally mounted from the base in a plane which intersects said flexible section, said pair of levers having opposed fingers at one end to engage and deflect said flexible section and opposed shoulders at the other;

b. a sliding member slidably mounted from the base beneath said shoulders; and c. a cam rotatably mounted on the sliding member in said plane, said cam positioned between the opposed shoulders of said levers, said levers being actuated by rotating the cam against the opposed shoulders.

14. A device useful in locating the centerline of a curved workpiece surface and positioning a plurality of tool elements in a configuration corresponding and in precise relation to such centerline comprising:

a. a base;

b. a support structure;

c. a guide member having a flexible section containing guide means adapted to receive the tool elements, said member being supported in relation to the base by the support structure;

d. a fixturing structure attached to the base to hold the workpiece, said fixturing structure and support structure establishing a positional relationship between the workpiece surface and flexible section such that the two points on the centerline of the surface between which a plurality of tool operations are to be performed are positioned precisely below the guide means at each end of the flexible section;

e. a pair of opposed gauging levers and a pair of opposed deflection levers commonly and pivotally mounted from the base, the gauging levers in a plane which intersects the workpiece and the deflection levers in a plane which intersects the flexible section, each pair of gauging and deflection levers having opposed fingers at one end and opposed shoulders at the other end, the gauging fingers being adapted to engage the workpiece and locate the centerline of the workpiece surface and the deflection fingers being adapted to engage and deflect the flexible section;

f. two cams rotatably mounted from the base, one of said cams being positioned in the plane of the gauging levers between the opposed shoulders thereof and the other cam being positioned in the plane of the deflection levers between the opposed shoulders thereof, said cams actuating the gauging and deflection fingers when rotatably engaged to the respective shoulders of said levers;

g. a shaft on which the cams are commonly but independently mounted in said planes;

h. a sliding member supported from the base beneath the cams and shaft, said member having a hole partially therethrough to rotatably receive the shaft;

i. said sliding member being caused to slide in a direction opposite to that of the curvature of the workpiece surface when said gauging fingers locate the centerline of the surface, said sliding movement situating the deflection levers such that, upon actuation, they will position the flexible section, and guide means therein, in a configuration corresponding to the centerline already located by the gauging levers.

15. The device of claim 14 wherein the support structure comprises:

a. a support member attached to the base; and b. a guide member support attached to and projecting from said support member over said base, said guide member support having spaced flanges on the side opposite said support member, to which flanges said guide member is attached.

16. The device of claim 14 wherein the flexible section of said guide member includes guide tubes embedded in a flexible matrix.

17. The device of claim 16 wherein copper guide tubes are embedded in a fiber glass matrix.

18. The device of claim 14 wherein the fixturing structure comprises:

a. two pairs of coplanar fixturing levers pivotally mounted in an opposed relationship from the base in a plane just below the flexible section, each pair of levers having opposed fingers at one end to engage the workpiece and opposed shoulders at the other end;

b. two cams rotatably mounted from the base in said plane, each cam positioned between the opposed shoulders of one pair of levers, said levers being actuated by rotating the cams against the shoulders; and c. locating stop means in predetermined relation to said levers, said stop means and fixturing levers cooperating to hold the workpiece surface in the desired position.

19. The device of claim 14 wherein the workpiece surface is the edge of a gas turbine engine part.

20. The device of claim 14 wherein the tool elements are drilling elements.

21. A method for establishing a plurality of tool elements in a desired configuration in relation to a workpiece surface comprising the steps of:

a. providing a guide member having a flexible section containing guide means adapted to receive the tool elements;

b. deflecting the flexible section to position the guide means in the desired configuration, including establishing a cooperative relationship between the desired configuration of guide means and workpiece surface.

22. The method of claim 21 wherein the workpiece surface is an edge of a gas turbine engine part.

23. The method of claim 22 wherein the desired configuration corresponds to the curvature of the edge.

24. The method of claim 21 wherein the tool elements are drilling elements.

* * * * *